(12) United States Patent
Bailey et al.

(10) Patent No.: US 10,599,396 B2
(45) Date of Patent: Mar. 24, 2020

(54) INTEGER DIVISION CIRCUIT AND METHOD OF PERFORMING INTEGER DIVISION IN HARDWARE

(71) Applicant: Continental Automotive Systems, Inc., Auburn Hills, MI (US)

(72) Inventors: Howard Wood Bailey, Santa Barbara, CA (US); Nitin Kataria, Goleta, CA (US); Tim Ho Chan, Santa Barbara, CA (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 438 days.

(21) Appl. No.: 15/449,200

(22) Filed: Mar. 3, 2017

(65) Prior Publication Data

US 2018/0253283 A1 Sep. 6, 2018

(51) Int. Cl.
| | | |
|---|---|---|
| *G06F 7/535* | (2006.01) |
| *G06F 5/01* | (2006.01) |
| *G01S 17/10* | (2020.01) |
| *G01S 7/4865* | (2020.01) |
| *G01S 17/89* | (2020.01) |

(52) U.S. Cl.
CPC ............ *G06F 7/535* (2013.01); *G01S 7/4865* (2013.01); *G01S 17/10* (2013.01); *G01S 17/89* (2013.01); *G06F 5/01* (2013.01)

(58) Field of Classification Search
CPC .......... G06F 5/012; G06F 7/487; G06F 7/485; G06F 7/4873; G06F 7/4917; G06F 7/49957
See application file for complete search history.

(56) References Cited

U.S. PATENT DOCUMENTS

2010/0250639 A1* 9/2010 Olson ................... G06F 7/4873
708/504
2014/0059096 A1* 2/2014 Kitamura ................ G06F 5/012
708/209

* cited by examiner

*Primary Examiner* — Luke D Ratcliffe
(74) *Attorney, Agent, or Firm* — Matthew Binkowski

(57) ABSTRACT

An integer division circuit includes a first bit-shifting circuit configured to shift the bits of a dividend to produce a normalized dividend. The circuit also includes a second bit-shifting circuit configured to shift the bits of a divisor to produce a normalized divisor. A divider tree circuit is configured to divide the normalized dividend by the normalized divisor to produce a normalized quotient. The circuit further includes a third bit-shifting circuit configured to shift the bits of the normalized quotient to produce a quotient.

12 Claims, 4 Drawing Sheets

INTEGER DIVISION CIRCUIT AND METHOD OF PERFORMING INTEGER DIVISION IN HARDWARE

TECHNICAL FIELD

The technical field relates generally to semiconductor hardware for performing mathematical calculations.

BACKGROUND

Modern microprocessors often utilize an arithmetic logic unit ("ALU") to perform certain mathematical functions, such as addition and subtraction. However, more advanced calculations, e.g., multiplication and division, are not typically solved using solely hardware. Instead, these calculations are solved using software algorithms that utilize the addition and/or subtraction functions of the ALU or similar circuits.

Unfortunately, this approach can be quite slow, particularly when a high volume of division operations must be performed. For example, in flash lidar and other applications, it is sometimes necessary to perform division and other mathematical calculations more quickly than the standard software approach can provide.

As such, it is desirable to present a circuit to perform integer division utilizing a software circuit. In addition, other desirable features and characteristics will become apparent from the subsequent summary and detailed description, and the appended claims, taken in conjunction with the accompanying drawings and this background.

BRIEF SUMMARY

An integer division circuit of one exemplary embodiment includes a first bit-shifting circuit configured to shift the bits of a dividend to produce a normalized dividend. The circuit also includes a second bit-shifting circuit configured to shift the bits of a divisor to produce a normalized divisor. A divider tree circuit is configured to divide the normalized dividend by the normalized divisor to produce a normalized quotient. The circuit further includes a third bit-shifting circuit configured to shift the bits of the normalized quotient to produce a quotient.

A method of performing integer division in a hardware circuit according to one exemplary embodiment includes shifting bits of a dividend with a first bit-shifting circuit to produce a normalized dividend. The method further includes shifting bits of a divisor with a second bit-shifting circuit to produce a normalized divisor. The method also includes dividing the normalized dividend by the normalized divisor with a divider tree circuit to produce a normalized quotient. The method further includes shifting the bits of the normalized quotient with a third bit-shifting circuit to produce a quotient.

A flash lidar sensor according to one exemplary embodiment includes a laser transmitter with a pulsed laser light output and a diffusing optic adapted to illuminate a reflecting surface with a pulsed laser light. The sensor also includes a receiving optic configured to collect the pulsed laser light reflected from the reflecting surface. An array of light sensitive detectors is positioned at a focal plane of the receiving optic. The sensor also includes a processor coupled to the array of light sensitive detectors. The processor includes an integer division circuit having a first bit-shifting circuit configured to shift the bits of a dividend to produce a normalized dividend and a second bit-shifting circuit configured to shift the bits of a divisor to produce a normalized divisor. The integer division circuit also includes a divider tree circuit configured to divide the normalized dividend by the normalized divisor to produce a normalized quotient The integer division circuit further includes a third bit-shifting circuit configured to shift the bits of the normalized quotient to produce a quotient.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, an integer division circuit 100 is shown and described herein.

Figure 1:
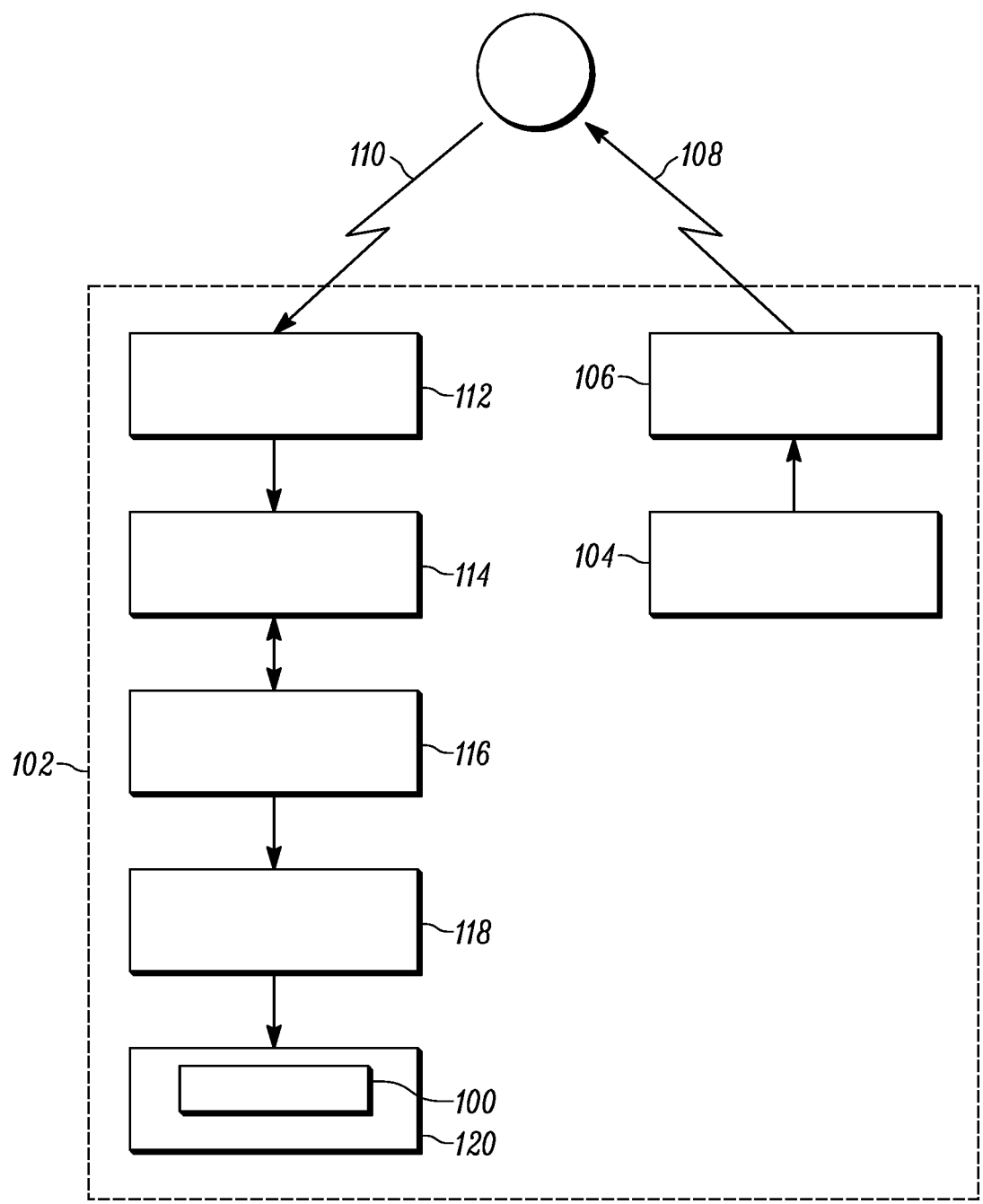
FIG. 1 is a block schematic diagram of a flash lidar system according to an exemplary embodiment.

The integer division circuit 100 may be implemented as part of a flash lidar system 102, as shown in FIG. 1. The flash lidar system 102 may be incorporated into a vehicle (not shown), e.g., an automobile. However, it should be appreciated that the flash lidar system 102 may be incorporated in other types of vehicles or other non-vehicle applications.

In the exemplary embodiment, the flash lidar system 102 includes a pulsed laser transmitter 104 coupled to transmit optics 106. The pulsed laser transmitter 104 and transmit optics 106 are configured to generate a first light pulse 108. The first light pulse 108 may reflect off a surface (not numbered) of one or more objects 109 and return as a second light pulse 110. The second light pulse is received by receive optics 112. The receive optics 112 are coupled to a detector array 116. The detector array 116 provides an analog signal to an analog-to-digital converter ("ADC") 118. The ADC 118 converts the analog signal to a digital signal, which is then supplied to a processor 120. The processor 120 is a computing device capable and configured to perform mathematical operations and/or execute instructions (i.e., run a program).

In this exemplary embodiment, the processor 120 includes the integer division circuit 100. The integer division circuit 100 is utilized to perform division calculations, particularly for use in determining the distances between the flash lidar system 102 and the one or more objects 109.

Figure 2:
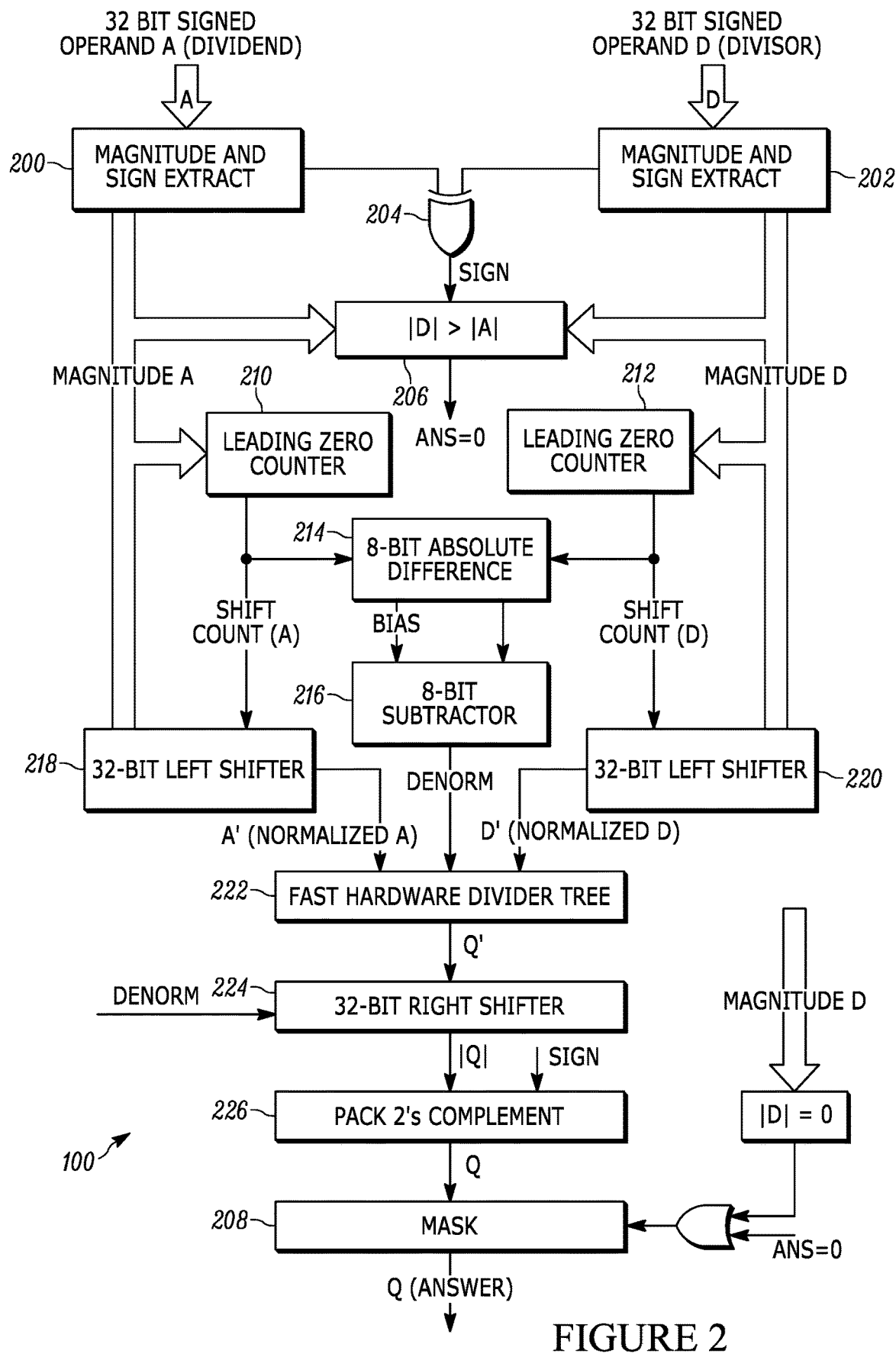
FIG. 2 is a block schematic diagram of an integer division circuit according to an exemplary embodiment.

A block diagram showing functionality of the integer division circuit 100 of one exemplary embodiment is shown in FIG. 2. The integer division circuit 100 receives a dividend A and a divisor D. In the exemplary embodiment, the dividend A and divisor D are each 32-bit signed integers in 2's complement notation. However, it should be appreciated that in other embodiments, integers of other sizes and/or unsigned integers may be received and utilized therein.

The integer division circuit 100 of the exemplary embodiment includes at least one hardware block 200, 202 configured to convert the 2's complement notation of the dividend A and the divisor D to sign and magnitude information. The at least one hardware block 200, 202 may be implemented as a first hardware block 200 and a second hardware block 202, as shown in FIG. 2, or in a single hardware block (not shown). More particularly, the first hardware block 200 is configured to convert the dividend A from a two's complement representation to a magnitude representation and the second hardware block 202 is configured to convert the divisor D from a two's complement representation to a magnitude representation.

The integer division circuit 100 of the exemplary embodiment also includes an exclusive-OR ("XOR") gate 204 electrically connected to the first and second hardware blocks 200, 202. The XOR gate 204 receives the extracted signs from the hardware blocks 200, 202 and determines a sign of a final quotient Q. When the signs of the dividend A and the divisor D are similar, the output of the XOR gate 204 is positive; otherwise, it is negative.

Further, the integer division circuit 100 includes a comparator circuit 206. The comparator circuit compares the divisor D to the dividend A. If the divisor D is larger than the dividend A, then the answer of division of the dividend A by the divisor D should be zero. This information is propagated to a final mask stage 208 of generating the final quotient Q, as described further below.

The integer division circuit 100 may also include at least one leading zero counter 210, 212. In the exemplary embodiment, the at least one leading zero counter 210, 212 is implemented with a first leading zero counter 210 for analyzing the dividend D and a second leading zero counter 212 for analyzing the divisor A. Each leading zero counter 210, 212 counts the number of leading zeros from the left most significant bit of the respective divisor A and dividend D. The number of leading zeros indicate the number of bit positions the divisor D and dividend A need to be shifted left such that there is a '1' in the most significant bit position. For example, if the 32-bit divisor D is "00000000000000000001110101010101," then there are eighteen leading zeros when the divisor D is parsed from left to right.

In the exemplary embodiment, the integer division circuit 100 also includes an absolute difference computation block 214. This block 214 calculates the absolute difference of the total number of leading zeros found in the magnitude of the dividend A and the magnitude of the divisor D and supplies this difference as an output. Since shifting in binary number system is essentially scaling by a factor of 2, this different tells the effective number or right shifts that will be needed during the process of de-normalizing the final quotient Q, as described below.

The exemplary embodiment of the integer division circuit 100 further includes a subtractor computation block 216. This block 216 generates a difference of a "bias" constant and the output of the absolute difference computation block 214. Bias is utilized to perform the correct amount of right shift to normalize the final quotient Q, as described in greater detail below. For a general case of an n-bit divider, if the operands A, D are unsigned, then the bias is n−1. On the other hand, if the operands A, D are signed, then the bias is n−2. As such, in the exemplary embodiment where a 32-bit signed division occurs, but the magnitude is essentially a 31-bit number, the bias is 30.

The integer division circuit 100 further includes a first bit-shifting circuit 218 and a second bit-shifting circuit 220. The first bit-shifting circuit 218 is configured to shift the bits of the dividend A to produce a normalized dividend A' and the second bit-shifting circuit 220 is configured to shift the bits of the divisor D to produce a normalized divisor D'. In the exemplary embodiment, the first bit-shifting circuit 218 is configured to repetitively left-shift the bits of the dividend A until a logical high, i.e., a '1', appears in a most significant bit position of the dividend A to produce the normalized dividend A'. Similarly, the second bit-shifting circuit 220 is configured to repetitively left shift the bits of the divisor D until a logical high appears in a most significant bit position of the divisor D to produce the normalized divisor D'.

For example, if the 32-bit dividend A sent to the first bit-shifting circuit 218 is "00000000000 0000000 01110101010101", then the normalized divided A' generated will be "11101010101010000000000000000000". Similarly, if the 32-bit divisor D sent to the second bit-shifting circuit 220 is "00000000000000000000000000000011", then the normalized divisor D' produced will be "11000000000000000000000000000000".

The integer division circuit 100 also includes a divider tree circuit 222. The divider tree circuit 222 is configured to receive the normalized dividend A' and the normalized divisor D' and is further configured to divide the normalized dividend A' by the normalized divisor D' to produce a normalized quotient Q'.

Figure 3:
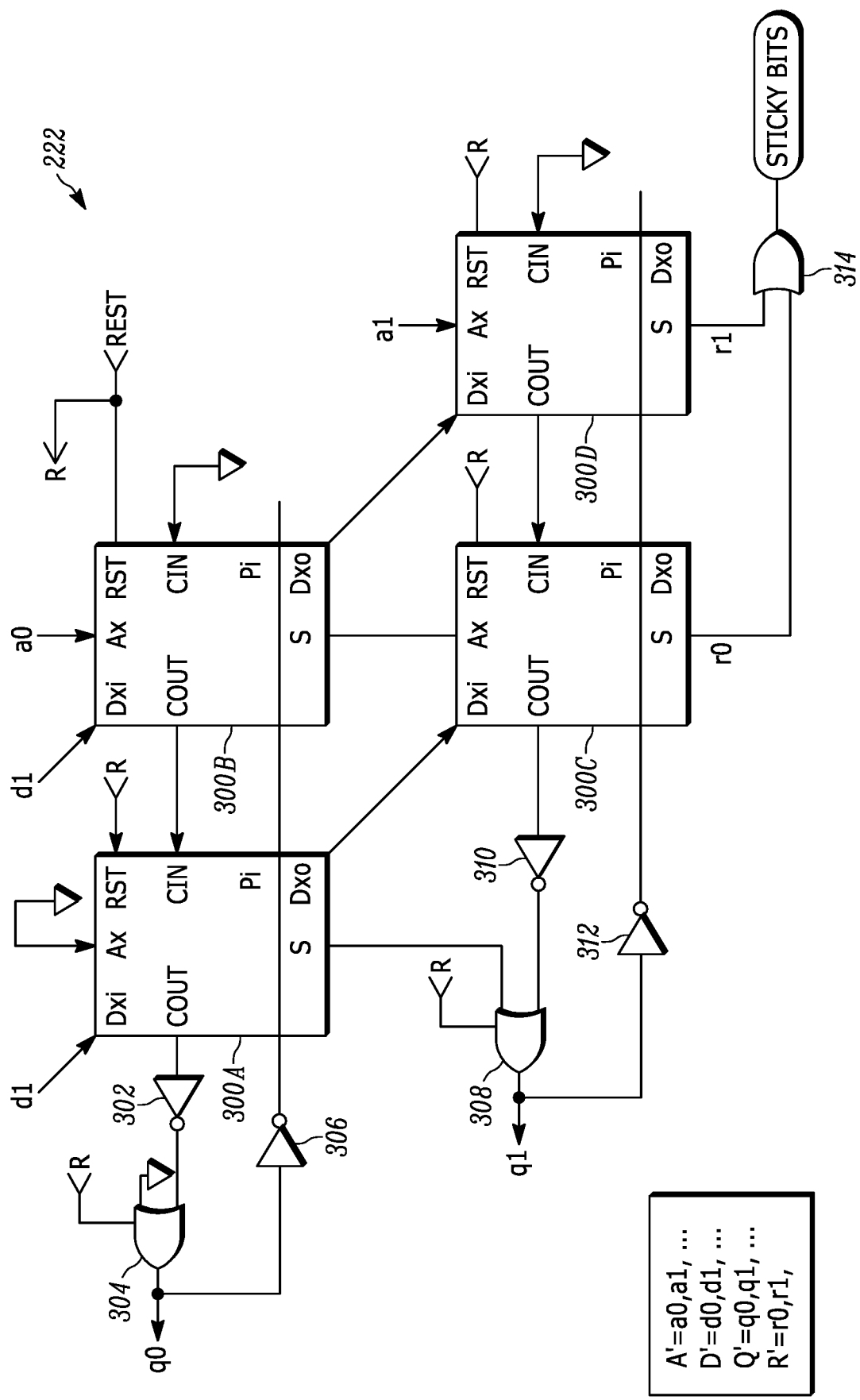
FIG. 3 is an electrical schematic diagram of a divider tree circuit of the integer division circuit according to an exemplary embodiment.
Figure 4:
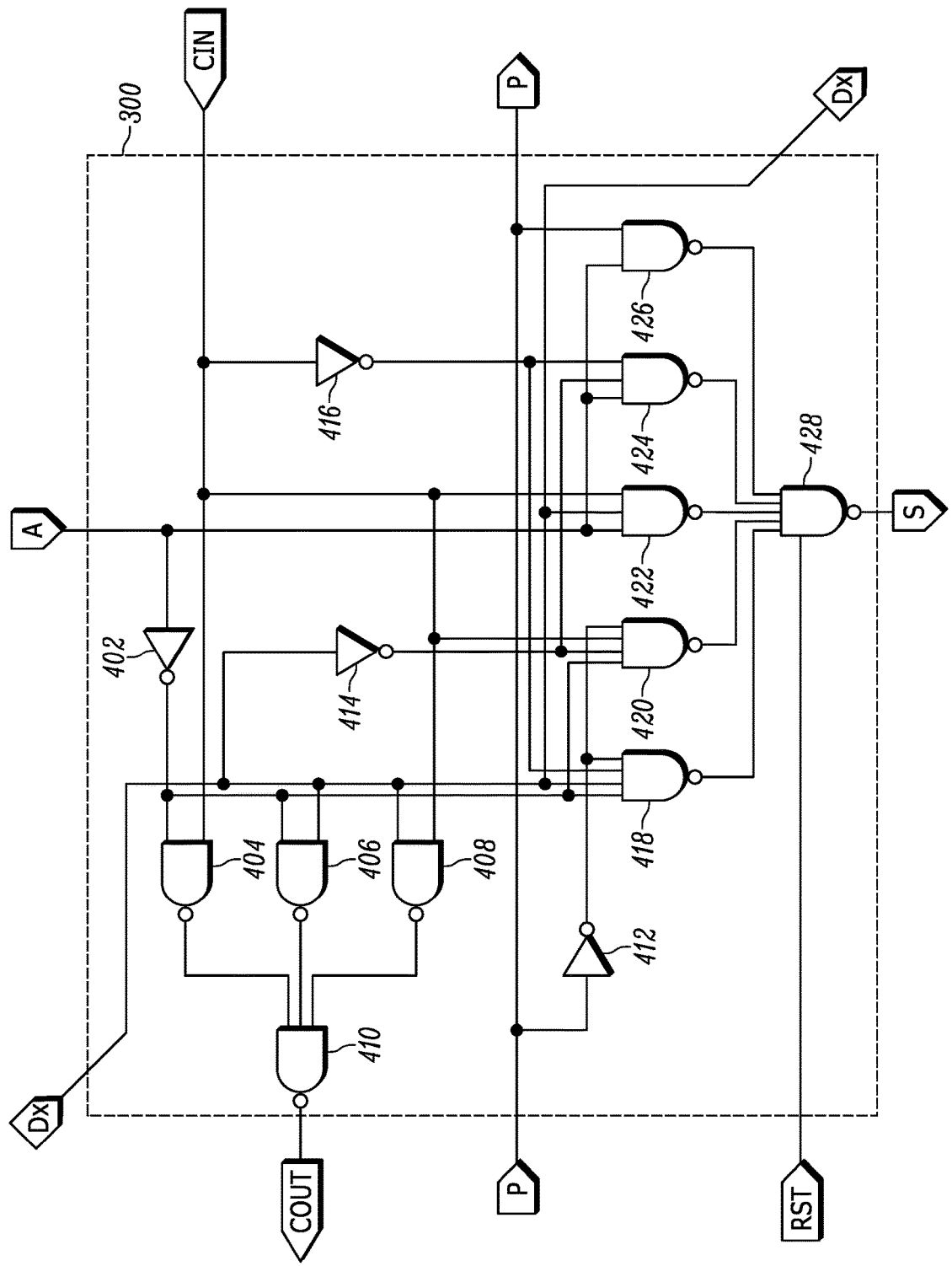
FIG. 4 is an electrical schematic diagram of a controlled subtractor cell of the divider tree circuit according to one exemplary embodiment.

Referring now to FIG. 3, the divider tree circuit 222 of the exemplary embodiment includes a plurality of controlled subtractor ("CS") cells 300. FIG. 4 shows a detail schematic diagram of one of the CS cells 300 according to one exemplary embodiment. Each CS cell 300 includes a subtrahend input Dxi for receiving the bit to be subtracted and a minuend input Ax for receiving the bit which is to be reduced by the subtrahend input Dxi. Each CS cell 300 also includes a subtrahend output Dxo for propagating the subtrahend input Dxi out of the cell 300. Each CS cell 300 also includes a carry input Cin, a carry output Cout, a mode control input Pi, a mode control output Po, a difference output S, and a reset input RST. In the exemplary embodiment, the mode control input Pi is electrically connected to the mode control output Po to propagate the value of the mode control input Pi out of the cell 300.

If the reset input RST is held high, the CS cell 300 sets the initial difference output S to zero. Otherwise, the difference output S and Cout indicate the result of the operation Ax-Dxi-Cin. If the mode control input Pi is held high, then the minuend input Ax is passed through the to the difference output S. If the mode control input Pi is driven low, then the CS cell 300 operates normally.

Inverter 402 produces the logical negation of input Ax, or Ax⁻. Not-AND ("NAND") gate 404 produces the output of [Ax⁻Cin]⁻. NAND gate 406 produces the output of [Ax⁻Dxi]⁻, while NAND gate 408 produces the output of [DxiCin]⁻. NAND gate 410 then produces the logical output Cout=[[Ax⁻Cin]⁻[Ax⁻Dxi]⁻[DxiCin]⁻], which reduces to Cout=[Ax⁻Cin]⁻+[Ax⁻Dxi]+[DxiCin].

Continuing with FIG. 4, inverter 412 produces the logical negation of mode control input Pi (Pi⁻). Inverter 414 produces the logical negation of input Dxi (Dxi⁻), and inverter 416 produces the logical negation of the carry in input Cin (Cin⁻). NAND gate 418 produces the logical output [Ax⁻DxiCin⁻Pi⁻]⁻, NAND gate 420 produces the logical output [Ax⁻Dxi⁻CinPi⁻]⁻, NAND gate 422 produces the logical output [AxDxiCin]⁻, and NAND gate 424 produces the logical output [AxDxi⁻Cin⁻]⁻. NAND gate 426 produces the logical output [AxPi]⁻. From these 5 NAND outputs, NAND gate 428 produces the difference output, which is $$S=\{[Ax^-DxiCin^-Pi^-]^-[Ax^-Dxi^-CinPi^-]^-[AxDxiCin]^-[AxDxi^-Cin^-]^-[AxPi]^-\}^-,$$

which can be reduced to $$S=[Ax^-DxiCin^-Pi^-]+[Ax^-Dxi^-CinPi^-]+[AxDxiCin]+[AxDxi^-Cin^-]+[AxPi].$$

Referring again to FIG. 3, it should be appreciated that only four controlled subtractor cells 300 are shown. Obviously, showing all of the controlled subtractor cells 300 utilized to process the 32-bit normalized divisor D' and dividend A', would be difficult to visualize in a single drawing. The four cells 300 shown in FIG. 3 are a 2×2 matrix arranged to receive two bits d0, d1 of the normalized divisor D' and two bits a0, a1 of the normalized dividend A' and, along with additional logic gates (described and numbered below), produce two bits q0, q1 of the normalized quotient Q'. It should also be appreciated that each row of the divider tree circuit 222 is composed of identical hardware, with identical connections, with the exception of the top row, and the bottom row.

Each controlled subtractor cell 300 includes a reset input RST connected to a reset signal line (not numbered) for receiving a reset signal. Each controlled subtractor cell 300 is also connected to a mode control input P. The mode control input P forces the controlled subtractor cell 300 to subtract the input Dx from the input A when P=0. If P=1, no operation takes place and A is passed through to the S output.

A first CS cell 300A in the top row has its Dxi input connected to the least-significant bit ("LSB") d0 of the normalized divisor D', and the Ax input connected to a digital ground. The first CS 300A in the top row also has a carry in (Cin) input connected to the carry out (Cout) of a second CS cell 300B to the immediate right. The Cout from the first CS cell 232, top row, is connected to the input of an inverter 302 which has an output connected to the input of an OR gate 304, The second input of the OR gate 304 at the left of the top row is connected to digital ground, so it operates essentially as a buffer with the proper time delay for the divider tree circuit 222. The output of this first OR gate 304 is q0, the most significant bit ("MSB") of the quotient, and is connected to an inverter 306. The output of inverter 306 is the mode control Pi for the top row of CS cells 300A, 300B. The difference output S of the first CS cell 300A is connected to an input of the mode control logic for the next lower row, i.e., an OR gate 308.

In each CS cell 300, the Dxi input is propagated to the Dxo output. As such, as shown in FIG. 3, the Dxi input is propagated to the CS cell 300 of the same rank in the next lower row. For instance, the output Dxo of the first CS cell 300A is directly connected to the input Dxi of a third CS cell 300C, which is the left-most cell in the adjacent lower row. Likewise, the output Dxo of the second CS cell 300B is connected to the input Dxi of a fourth CS cell 300D.

The second CS cell 300B is also the rightmost cell of the top row, and therefore has its carry in input Cin connected to digital ground. The second CS cell 300B in the top row has its input Dxi connected to the second bit d1 of the normalized divisor D' and the Ax input connected to the first bit a0 of the normalized dividend A'. The difference output S of the second CS cell 300B is connected to the Ax input of the third CS cell 300C (i.e., the leftmost cell of the next lower row).

Continuing with FIG. 3, the second row and lower rows (not shown) are organized identically to the top row, though some of the input connections to the second row are different than the top row. As stated above, the third CS cell 300C (i.e., the first CS cell in the second row) has its Dxi input connected to the Dxo output of the first CS cell 300A (i.e., the first CS cell in the first row). The Ax input of the third CS cell of 300C is connected to the difference output S of the second CS cell 300B. The third CS cell 300C also has its carry in input Cin connected to the carry out output Cout of the fourth CS cell 300D (i.e., the cell to the immediate right). The Cout from the third CS cell 300C in the second row, is connected to the input of an inverter 310 which has an output connected to the input of the OR gate 308. The second input of the OR gate 308 is connected to the difference output S of the first CS cell 300A. The output of this OR gate 308 is q1, the second bit of the normalized quotient Q', and is also connected to an inverter 312. The output of inverter 312 is the mode control Pi for the second row. The difference output S of the third CS cell 300C is connected to a first input of an OR gate 314 which determines if there are any remainder bits in the operation. The third CS cell 300C does not have any connection to the Dxo output, as it is also the last row in this case.

The fourth CS cell 300D is also the rightmost cell of the second row, and therefore has a carry in input Cin connected to digital ground, while the Ax input is connected to the a1 bit of the normalized dividend A'. The Dxi input of the fourth CS cell 300D is connected to the Dxo output of the second CS cell 300D. The difference output S of the fourth CS cell 300D is connected to a second input of the OR gate 314 which determines if there are any remainder bits in the operation. The output of OR gate 314 indicates the presence of a remainder from the divide operation of the divider tree circuit 222. The output of the OR gate 314 is labeled as STICKY bit.

Referring again to FIG. 2, the integer division circuit 100 also includes a third bit-shifting circuit 224. The third bit-shifting circuit 224 is configured to right shift the bits of the normalized quotient Q'. In the exemplary embodiment, the third bit-shifting circuit is configured to right shift the bits of the normalized quotient Q' for a determined number of repetitions. The determined number of repetitions is based at least in part on the number of left shifts of the first bit-shifting circuit 218 and the second bit-shifting circuit 220. More particularly, in the exemplary embodiment, subtractor computation block 216 produces a "denorm" signal, as shown in FIG. 2, and as described above. The third bit-shifting circuit 224 utilizes the denorm signal to shift the bits of the normalized quotient Q'.

The integer division circuit 100 further includes a third hardware block 226. The third hardware block 226 receives an output from the third bit-shifting circuit 224. The third hardware block 226 also receives the output of the XOR gate 204, which represents the sign (+ or −) of the quotient Q based on the extracted signs from the initial dividend A and divisor D. The third hardware block 226 utilizes the output from the third bit-shifting circuit and the sign from the XOR gate 204 to produce the quotient Q as a signed, two's complement number.

As mentioned previously, the integer division circuit 100 also includes a final mask stage 208. In the exemplary embodiment, the final mask stage is a logical bitwise AND block and is used to mask the final quotient Q output with all zeros in the event of the absolute value of the divisor D being greater than the absolute value of the dividend A, where the answer to division would result in zero. Simultaneously, this final mask stage 208 also masks the final Q output with zeros in case the absolute value of the divisor D is zero, i.e., when a divide-by-zero exception occurs. Various other combinations of exceptions can also be logically ORed for the final mask stage 208 depending on the hardware requirements.

The integer division circuit 100 and methods described herein operate at a much faster rate than prior art techniques. One reason for this faster rate is that the normalization of the operands (i.e., the divisor D and the dividend A) reduces the number of carry (or borrow) bits that need to be propagated through the divider tree circuit 222. As such, in circuit simulations using SPICE, a 7-10× speedup is observed.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. An integer division circuit comprising:
a first bit-shifting circuit configured to shift bits of a dividend to produce a normalized dividend;
a second bit-shifting circuit configured to shift bits of a divisor to produce a normalized divisor;
a divider tree circuit configured to divide the normalized dividend by the normalized divisor to produce a normalized quotient;
a third bit-shifting circuit configured to shift the bits of the normalized quotient to produce a quotient; and
a mask stage configured to receive the quotient and to mask the quotient in response to at least one of an absolute value of the divisor being greater than the absolute value of the dividend and the absolute value of the divisor being zero.

2. The integer division circuit as set forth in claim 1, wherein said first bit-shifting circuit is configured to repetitively left shift the bits of the dividend until a logical high appears in a most significant bit position of the dividend to produce the normalized dividend.

3. The integer division circuit as set forth in claim 2, wherein said second bit-shifting circuit is configured to repetitively left shift the bits of the divisor until a logical high appears in a most significant bit position of the divisor to produce the normalized divisor.

4. The integer division circuit as set forth in claim 3, wherein said third bit-shifting circuit is configured to right shift the bits of the normalized quotient for a determined number of repetitions, the determined number of repetitions based at least in part on a number of left shifts of the first bit-shifting circuit and the second bit-shifting circuit.

5. The integer division circuit as set forth in claim 1, wherein the divider tree circuit includes a plurality of controlled subtractor cells.

6. The integer division circuit as set forth in claim 1, further comprising a first hardware block configured to convert the dividend from a two's complement representation to a magnitude representation.

7. The integer division circuit as set forth in claim 1, further comprising a second hardware block configured to convert the divisor from a two's complement representation to a magnitude representation.

8. The integer division circuit as set forth in claim 1, further comprising a third hardware block to receive an output from said third bit-shifting circuit and generate the quotient Q as a signed, two's complement value.

9. The integer division circuit as set forth in claim 1, wherein an input of said divider tree circuit is electrically connected to outputs of said first bit-shifting circuit and said second bit-shifting circuit such that bit-shifting of the dividend and divisor occur prior to dividing by said divider tree circuit.

10. A flash lidar sensor comprising:
a laser transmitter with a pulsed laser light output and a diffusing optic adapted to illuminate a reflecting surface with a pulsed laser light;
a receiving optic configured to collect the pulsed laser light reflected from the reflecting surface;
an array of light sensitive detectors positioned at a focal plane of said receiving optic; and
a processor coupled to said array of light sensitive detectors,
said processor including an integer division circuit having
a first bit-shifting circuit configured to shift the bits of a dividend to produce a normalized dividend,
a second bit-shifting circuit configured to shift the bits of a divisor to produce a normalized divisor,
a divider tree circuit configured to divide the normalized dividend by the normalized divisor to produce a normalized quotient, and
a third bit-shifting circuit configured to shift the bits of the normalized quotient to produce a quotient.

11. The flash lidar sensor as set forth in claim 10, wherein said processor is further configured to determine a distance to the reflecting surface based at least in part on the quotient produced by said integer division circuit.

12. An integer division circuit comprising:
a first bit-shifting circuit configured to shift bits of a dividend to produce a normalized dividend;
a second bit-shifting circuit configured to shift bits of a divisor to produce a normalized divisor;
a divider tree circuit configured to divide the normalized dividend by the normalized divisor to produce a normalized quotient; and
a third bit-shifting circuit configured to shift the bits of the normalized quotient to produce a quotient;
wherein an input of said divider tree circuit is electrically connected to outputs of said first bit-shifting circuit and said second bit-shifting circuit such that bit-shifting of the dividend and divisor occur prior to dividing by said divider tree circuit.

* * * * *